Patented June 30, 1953

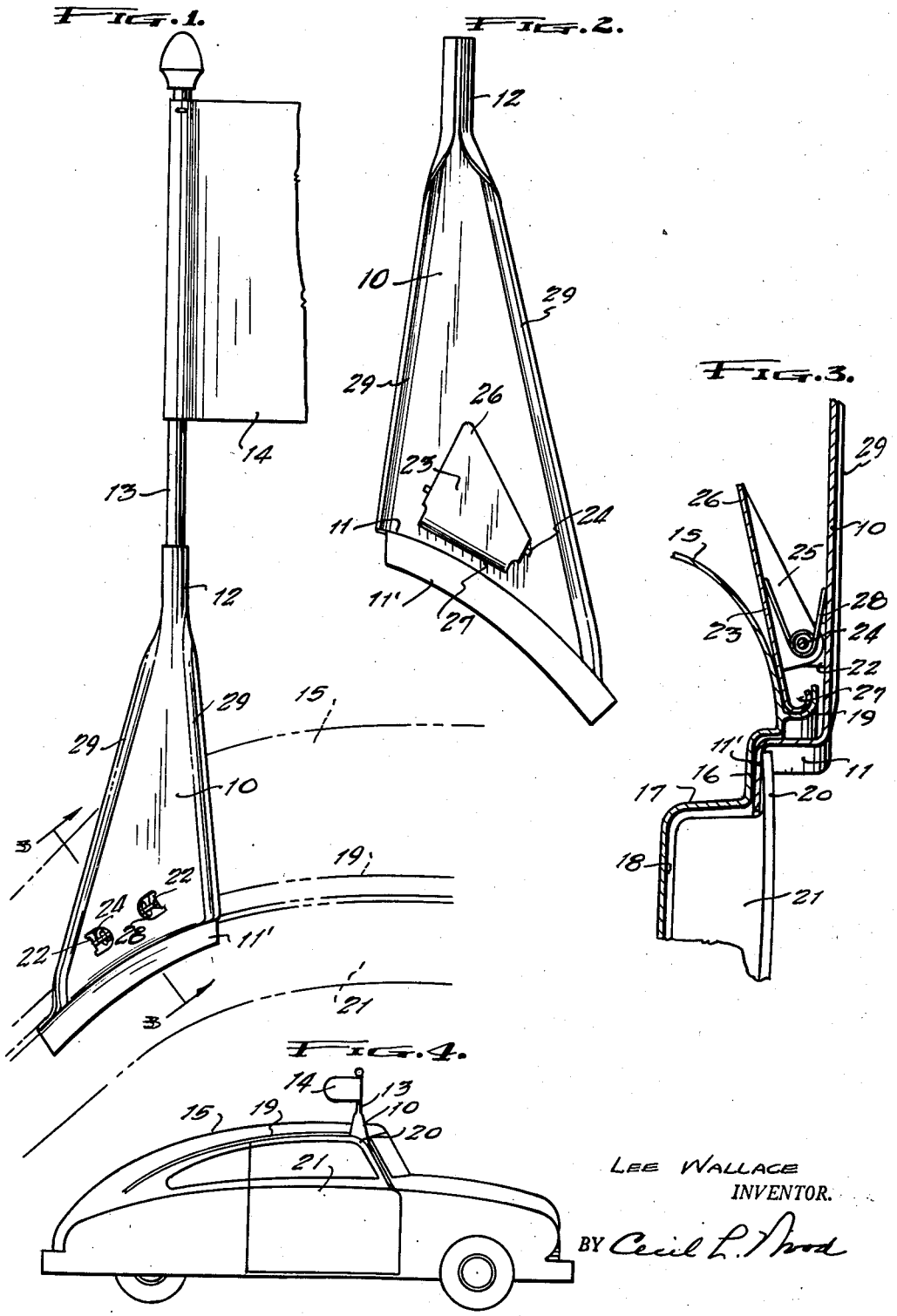

2,643,841

UNITED STATES PATENT OFFICE 2,643,841

VEHICLE STANDARD

Lee Wallace, Fort Worth, Tex.

Application March 1, 1948, Serial No. 12,449

2 Claims. (Cl. 248—43)

This invention relates to flag standards for automobiles, or devices for designating vehicles as by a banner bearing an insignia, and its principal object resides in the provision of a simple device capable of detachable securement to an automobile affording a means for carrying an identifying symbol, as a funeral flag carrying appropriate indicia.

An object of the invention is manifest in the provision of an inexpensive yet attractive device formed with contoured flanges adapting the same to suitable adjustment to the upper body of the vehicle in the top of one of its doors and conforming to the contours of the said body in such manner as to blend into its lines and not detract from the appearance of the vehicle.

A still further object of the invention is that of providing a suitable standard whereby a funeral procession, for example, can be properly designated and thus avoid interception by vehicles not concerned therewith, such standards being provided by the undertaker in charge and removed by him when their use is no longer required.

Broadly, the invention contemplates the provision of a readily attachable and removable standard for motor vehicles for identifying, or otherwise marking said vehicles, affording a simple, economical and substantial apparatus adapted for use on all type of passenger cars and trucks with cabs.

While the foregoing objects are paramount, other and lesser objects will become manifest as the description proceeds, taken in connection with the appended drawings, wherein:

Figure 1 is a front elevational view of the invention operatively attached to an automobile shown fragmentarily.

Figure 2 is a rear perspective illustration of the body member of the device, showing the tensioned retaining clamp.

Figure 3 illustrates the invention, in partial cross-section on lines 3—3 of Figure 1, attached to an automobile, as viewed from the front of the car, the tensioned clamp being engaged with the rain trough, and Figure 4 illustrates an automobile having the invention applied.

Accordingly, the invention comprises a body member 10 which is preferably formed by stamping from suitable sheet metal, in the manner shown particularly in Figure 2, and is substantially triangular, having an off-set flange 11 formed integrally along its lower edge. The body member 10 normally assumes a vertical position and has a tubular socket 12 formed at its apex to receive a standard 13 for a flag or banner 14.

The flange 11 is curved forwardly and downwardly, as the invention is applied to an automobile 15, to conform to the contour of the top of the vehicle which in collective modern design, has long, flowing curves for streamlining. The radius of the curve formed in the flange 11 is calculated to be conformable to any of the current body designs and is adjusted to a position along the curved top of the vehicle so that the staff 13 supported on the member 10 is substantially vertical, as shown in Figures 1 and 4.

The flange 11 extends at right angles from the body 10 and has a depending portion 11' which is arranged parallel to the plane surfaces for the body member 10 and bears against the outer surface 16 of the header 17 of the door opening 18 of the vehicle 15, in the manner shown in Figure 3, just below the rain trough 19 which conventionally extends from a point forwardly of the doors toward the rear of the vehicle 15, as in Figure 4. The flange 20 of the door 21 engages the depending member 11' of the flange 11 and thus the invention is more securely retained on the automobile.

On the member 10 are formed a pair of spaced ears 22 which project rearwardly therefrom and provide pivotal supports for a clamp 23 arranged on a pin 24 extending between the ears 22, as illustrated in Figure 3.

The clamp member 23 is formed with right-angular ears 25 through which the pin 24 is also arranged, the upper end 26 of the clamp 23 providing a manipulating medium while the opposite or lower end 27 is rolled so as to conformably engage the trough 19 which, in cooperation with the flange 11 and the member 11' thereon, the body member 10 is supported on the vehicle 15. A spring 28 is provided to exert a tension upon the clamp 23 to normally hold the same in position.

Obviously, the body member 10 can be formed for application on either the right or left side of the vehicle 15, although it is generally desirable to attach the device to the left or traffic side of the vehicle when only one flag is displayed. To provide for rigidity the body 10 is embossed along its edges 29, and its form may be modified to meet the individual requirements. Other changes in design and construction may also be resorted to from time to time, by persons skilled in the art, without departing from the spirit and intent of the invention or the scope of the appended claims.

What is claimed is:

1. In a flag standard for detachable securement to the rain trough of a motor vehicle, in combination, a substantially triangular body member formed with a tubular socket at its apex, an offset flange formed along the base of said triangular body member and curved longitudinally to conform to the contour of the rain trough of a motor vehicle body forwardly thereof and extending therebeneath, a clamp hinged to said body and having means thereon for engaging said rain trough behind said body and secure the same to said trough, and a spring engaging said clamp for detachably retaining the same against said trough.

2. In a flag standard for detachable securement to a rain trough on an automobile body, in combination, a main body member formed with its edges converging upwardly and having a tubular socket at its upper end, an offset flange formed along the base of said body member defining an arcuate shoulder conformable with the underside of a curved rain trough, and a tensioned clamp hingedly attached to the back side of said body member and conformably engageable with the said rain trough opposite the said shoulder to secure the said body member to said rain trough and support said socket in a vertical plane.

LEE WALLACE.

References Cited in the file of this patent

UNITED STATES PATENTS

| Number | Name | Date |
|---|---|---|
| 2,294,986 | Hynek | Sept. 8, 1942 |
| 2,334,856 | Atkinson | Nov. 23, 1943 |
| 2,362,368 | Gardella | Nov. 7, 1944 |
| 2,461,897 | Hopkins | Feb. 15, 1949 |
| 2,470,477 | Ellithorpe | May 17, 1949 |
| 2,527,357 | Donahey | Oct. 24, 1950 |
| 2,546,855 | Frame | Mar. 27, 1951 |